US010180933B2

(12) United States Patent
Chavoustie et al.

(10) Patent No.: US 10,180,933 B2
(45) Date of Patent: *Jan. 15, 2019

(54) METHODS, SYSTEMS AND COMPUTER PROGRAM PRODUCTS FOR FACILITATING VISUALIZATION OF INTERRELATIONSHIPS IN A SPREADSHEET

(71) Applicant: International Business Machines Corporation, Armonk, NY (US)

(72) Inventors: Michael D. Chavoustie, New Knoxville, OH (US); Andrew Eberbach, Toronto (CA); Trevor L. Montgomery, Austin, TX (US); Joshua M. Woods, San Francisco, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 950 days.

This patent is subject to a terminal disclaimer.

(21) Appl. No.: 14/245,847

(22) Filed: Apr. 4, 2014

(65) Prior Publication Data
US 2014/0223276 A1 Aug. 7, 2014

Related U.S. Application Data

(62) Division of application No. 10/960,131, filed on Oct. 7, 2004, now Pat. No. 8,745,483.

(51) Int. Cl.
*G06F 17/22* (2006.01)
*G06F 17/24* (2006.01)

(52) U.S. Cl.
CPC .................. *G06F 17/246* (2013.01)

(58) Field of Classification Search
CPC ...... G06F 9/4843; G06F 9/543; G06F 17/246; G06F 2209/482
See application file for complete search history.

(56) References Cited

U.S. PATENT DOCUMENTS 5,255,356 A 10/1993 Michelman et al.
5,544,299 A * 8/1996 Wenstrand ............ G06F 3/0489
715/802

(Continued)

FOREIGN PATENT DOCUMENTS

EP 211151 A2 2/1987
GB 2358936 A 8/2001

OTHER PUBLICATIONS

Shiozawa et al; "3D Interactive Vusualization for Inter-Cell Dependencies of Spreadsheets,"; Department of Information and Computer Sckience, Keio University, Yolohama Japan.

(Continued)

*Primary Examiner* — Maikhanh Nguyen
(74) *Attorney, Agent, or Firm* — Fabian VanCott; Steven L. Nichols

(57) ABSTRACT

Methods, systems and computer program products are provided for visually indicating relationships among cells in a spreadsheet. Each of a first graphical linking element extending between cells in a first branch of a dependency tree of a root cell and a second graphical linking element extending between cells in a second branch of the dependency tree of the root cell is independently displayed and hidden.

15 Claims, 19 Drawing Sheets

(56) References Cited

U.S. PATENT DOCUMENTS

| | | | |
|---|---|---|---|
| 5,701,499 A * | 12/1997 | Capson | G06F 17/246 715/212 |
| 5,917,492 A * | 6/1999 | Bereiter | G06F 3/0489 715/799 |
| 5,987,481 A | 11/1999 | Michelman et al. | |
| 6,057,837 A | 5/2000 | Hatakeda et al. | |
| 6,185,582 B1 | 2/2001 | Zellweger et al. | |
| 6,225,996 B1 | 5/2001 | Gibb et al. | |
| 6,252,592 B1 * | 6/2001 | King | G06F 8/34 715/764 |
| 6,256,649 B1 | 7/2001 | Mackinlay et al. | |
| 6,430,584 B1 | 8/2002 | Comer et al. | |
| 6,438,565 B1 | 8/2002 | Ammirato et al. | |
| 6,460,059 B1 * | 10/2002 | Wisniewski | G06F 17/246 715/205 |
| 6,637,022 B1 * | 10/2003 | Weeren | G06F 8/34 715/763 |
| 6,640,234 B1 | 10/2003 | Coffen et al. | |
| 6,701,485 B1 | 3/2004 | Igra et al. | |
| 6,711,715 B1 | 3/2004 | Grealish | |
| 6,725,422 B1 * | 4/2004 | Bauchot | G06F 17/246 715/220 |
| 6,766,512 B1 | 7/2004 | Khosrowshahi et al. | |
| 6,976,212 B2 | 12/2005 | Newman et al. | |
| 7,010,779 B2 * | 3/2006 | Rubin | G06F 8/30 715/212 |
| 7,107,519 B1 * | 9/2006 | Webster | G06F 17/246 715/212 |
| 7,178,098 B2 * | 2/2007 | Bauchot | G06F 17/246 715/212 |
| 7,275,207 B2 | 9/2007 | Aureglia et al. | |
| 7,467,350 B2 | 12/2008 | Aureglia et al. | |
| 7,546,523 B2 | 6/2009 | Aureglia et al. | |
| 2002/0023105 A1 | 2/2002 | Wisniewski | |
| 2002/0038303 A1 * | 3/2002 | Gelfand | G06F 17/30595 |
| 2002/0091871 A1 | 7/2002 | Cahill et al. | |
| 2003/0188256 A1 | 10/2003 | Aureglia et al. | |
| 2003/0188257 A1 | 10/2003 | Aureglia et al. | |
| 2003/0188258 A1 | 10/2003 | Aureglia et al. | |
| 2003/0188259 A1 | 10/2003 | Aureglia et al. | |
| 2003/0218641 A1 * | 11/2003 | Longobardi | G06F 17/30067 715/853 |
| 2006/0080595 A1 | 4/2006 | Chavoustie et al. | |
| 2006/0107196 A1 | 5/2006 | Thanu et al. | |

OTHER PUBLICATIONS

"Spreadsheet Formula Highlighting Tool." IBM Technical Disclosure Bulletin, vol. 32, No. 6A, Nov. 1989, pp. 1-2.

WUGNET Tip of the Day! "Exclude Hidden Cells from Copy", 2001, pp. 1-2.

C. Stinson et al. "Microsoft Office Excel 2003 Inside Out", Microsoft Press, XP002381193, ISBN: 073561511X, pp. 257-261, 274-280, and 380-381.

* cited by examiner

FIG. 3

|   | A | B | C | D | E |
|---|---|---|---|---|---|
| 1 | =B1+B7+A3 | =B3+D1 | | =E2 | |
| 2 | | | | | 4.0 |
| 3 | =A6 | =C4+A6 | | | |
| 4 | | | 7.0 | 8.0 | 3.0 |
| 5 | | | | | |
| 6 | 9.0 | | | | |
| 7 | =A9+A6 | =D4+E4+E14 | | | |
| 8 | | | | | |
| 9 | 11.0 | | | | |

100

Dependents   On Screen: 0
Precedents   Off Screen: 0
All Paths    Shown: 0
Thumbtack    Hidden: 0
Lock Mode    ☐ Levels 110   112

FIG. 5  *100*

|   | A | B | C | D | E |
|---|---|---|---|---|---|
| 1 | =B1+B7+A3 ᵘ | =B3+D1 [1] |   | =E2 [2] |   |
| 2 |   |   |   |   | 4.0 [3] |
| 3 | =A6 [1] | =C4+A6 [2] | [3] |   |   |
| 4 |   | *132* | 7.0 | 8.0 [2] | 3.0 [2] |
| 5 |   |   | *130* |   |   |
| 6 | 9.0 [3+] |   |   |   |   |
| 7 | =A9+A6 | =D4+E4+E14 [1] |   |   |   |
| 8 |   |   |   |   |   |
| 9 | 11.0 |   |   |   |   |

Dependents   On Screen: 10
✓ Precedents   Off Screen: 1
All Paths   Shown: 11
Thumbtack   Hidden: 0
Lock Mode   [All] Levels

|   | A | B | C | D | E |
|---|---|---|---|---|---|
| 1 | =B1+B7+A3 | =B3+D1 |   | =E2 |   |
| 2 |   |   |   |   | 4.0 |
| 3 | =A6 | =C4+A6 |   |   |   |
| 4 |   |   | 7.0 | 8.0 | 3.0 |
| 5 |   |   |   |   |   |
| 6 | 9.0 |   |   |   |   |
| 7 | =A9+A6 | =D4+E4+E14 |   |   |   |
| 8 |   |   |   |   |   |
| 9 | 11.0 |   |   |   |   |

Dependents   On Screen: 10
✓ Precedents   Off Screen: 1
All Paths    Shown: 11
Thumbtack    Hidden: 0
Lock Mode    [All] Levels

FIG. 8

|   | A | B | C | D | E |
|---|---|---|---|---|---|
| 1 | =B1+B7+A3 | =B3+D1 |   | =E2 |   |
| 2 |   |   |   |   | 4.0 |
| 3 | =A6 | =C4+A6 |   |   |   |
| 4 |   |   | 7.0 | 8.0 | 3.0 |
| 5 |   |   |   |   |   |
| 6 | 9.0 |   |   |   |   |
| 7 | =A9+A6 | =D4+E4+E14 |   |   |   |
| 8 |   |   |   |   |   |
| 9 | 11.0 |   |   |   |   |

Dependents    On Screen: 10
✓ Precedents   Off Screen: 1
All Paths     Shown: 11
✓ Thumbtack   Hidden: 0
Lock Mode     [All] Levels

FIG. 10 *100*

|   | A | B | C | D | E |
|---|---|---|---|---|---|
| 1 | =B1+B7+A3 ᵘ | =B3+D1 ¹ |   | =E2 ² |   |
| 2 |   |   |   |   | 4.0 ³ |
| 3 | =A6 ² | =C4+A6 ² |   |   |   |
| 4 |   |   | 7.0 | ³ 8.0 | ² 3.0 |
| 5 |   |   |   |   |   |
| 6 | 9.0 ³⁺ |   |   |   |   |
| 7 | =A9+A6 ² | =D4+A7+E14 ¹ |   |   |   |
| 8 |   | *120* |   |   |   |
| 9 | 11.0 |   |   |   |   |

*154*

| Dependents | On Screen: 10 |
| ✓ Precedents | Off Screen: 1 |
| All Paths | Shown: 11 |
| Thumbtack | Hidden: 0 |
| ✓ Lock Mode | [All] Levels |

| | A | B | C | D | E |
|---|---|---|---|---|---|
| 1 | =B1+B7+A3 | =B3+C2 | *158* | =E2 | |
| 2 | | | =C2 | *156* | 4.0 |
| 3 | =A6 | =C4+A6 | | | |
| 4 | | | 7.0 | 8.0 | 3.0 |
| 5 | | | | | |
| 6 | 9.0 | | | | |
| 7 | =A9+A6 | =D4+A7+E14 | | | |
| 8 | | | | | |
| 9 | 11.0 | | | | |

Dependents     On Screen: 11
✓ Precedents   Off Screen: 1
All Paths      Shown: 12
Thumbtack      Hidden: 0
✓ Lock Mode    [All] Levels

*110*

METHODS, SYSTEMS AND COMPUTER PROGRAM PRODUCTS FOR FACILITATING VISUALIZATION OF INTERRELATIONSHIPS IN A SPREADSHEET

RELATED APPLICATIONS

The present application is a continuation, and claims the benefit under 35 U.S.C. § 120, of U.S. application Ser. No. 10/960,131, filed Oct. 7, 2004, now U.S. Pat. No. 8,745,483. This application is hereby incorporated by reference in its entirety.

BACKGROUND OF THE INVENTION

The invention relates to spreadsheets in general and, more particularly, to methods, systems and computer program products for processing interrelationships in a spreadsheet.

An electronic spreadsheet is a multi-dimensional grid containing data and formulas that are entered in a manner allowing computer manipulation. The formulas relate and produce results. As more data and formulas are entered into a spreadsheet, the interrelations that occur can become complex and difficult to readily understand and evaluate. For example, debugging or auditing a spreadsheet to find an error may be difficult because users cannot easily or visually assess and interpret how cells of the spreadsheet interrelate.

SUMMARY OF THE INVENTION

Certain embodiments of the present invention provide methods, systems and computer program products for visually indicating relationships among cells in a spreadsheet. According to embodiments of the present invention, each of a first graphical linking element extending between cells in a first branch of a dependency tree of a root cell and a second graphical linking element extending between cells in a second branch of the dependency tree of the root cell is independently displayed and hidden.

According to further embodiments of the present invention, a method for visually indicating relationships among cells in a spreadsheet includes: displaying level indicia on a branch cell in a branch of a dependency tree of a root cell, wherein the level indicia indicates a level of the branch cell in the dependency tree; and displaying a graphical linking element extending between the root cell and the branch cell.

According to further embodiments of the present invention, a method for visually indicating relationships among cells in a spreadsheet includes displaying level indicia on a branch cell in a branch of a dependency tree of a root cell. The level indicia includes alphanumeric indicia indicating a level of the branch cell in the dependency tree.

According to further embodiments of the present invention, a method for visually indicating relationships among cells in a spreadsheet includes: visually indicating at least one dependency relationship between cells in an initial dependency tree of a root cell; and responsive to a revision in the initial dependency tree, automatically visually indicating the revised dependency tree of the root cell.

According to further embodiments of the present invention, a method for visually indicating relationships among cells in a spreadsheet includes visually indicating that a leaf cell of a dependency tree of a root cell is a leaf cell of the dependency tree.

According to further embodiments of the present invention, a method for visually indicating relationships among cells in a spreadsheet includes visually indicating that a branch cell of a dependency tree of a root cell is referenced by a plurality of cells in the dependency tree.

According to further embodiments of the present invention, a method for visually indicating changes to cells in a spreadsheet includes visually indicating a first changed cell and/or a cell depending therefrom and a second changed cell and/or a cell depending therefrom in a manner that differentiates the relative order of the changes to the first and second changed cells.

According to further embodiments of the present invention, a method for visually indicating relationships among cells in a spreadsheet includes: designating a reference cell; receiving input from a user selecting a second cell; and automatically displaying a graphical linking element between the reference cell and the second cell if the second cell is a root cell including the reference cell in a dependency tree thereof.

Although embodiments of the invention have been described above primarily with respect to methods, according to further embodiments of the present invention, computer program products are provided including a computer readable medium having computer readable program code embodied therein, the computer readable program code comprising computer readable program code configured to execute the respective steps of the methods set forth above. According to further embodiments of the present invention, systems are provided including means for executing the respective steps of the methods set forth above.

BRIEF DESCRIPTION OF THE DRAWINGS

FIG. 3 represents a spreadsheet and a dialogue box including different menu options according to some embodiments of the present invention.

FIG. 5 represents the same spreadsheet as in FIG. 4, except that a path display feature is enabled with respect to cell E4, according to embodiments of the invention.

FIG. 6 represents the same spreadsheet as in FIG. 5, except that the path display feature is de-enabled with respect to cell E4 and is enabled with respect to cell C3, according to embodiments of the invention.

FIG. 8 represents the same spreadsheet as in FIG. 4, except a thumbtack feature is enabled with respect to cell A6, according to embodiments of the invention.

FIG. 10 represents the same spreadsheet as in FIG. 4, except that a lock mode feature is enabled with respect to cell A1, the formula of cell B7 has been revised, the visual tracking display has been updated, and a changes tracking feature is enabled in accordance with embodiments of the present invention.

FIG. 11 represents the same spreadsheet as in FIG. 10, except that the formulas of cells B1 and C2 have been revised and the visual tracking display and the changes tracking display have been updated, according to embodiments of the invention.

DETAILED DESCRIPTION OF EMBODIMENTS OF THE INVENTION

Figure 1:
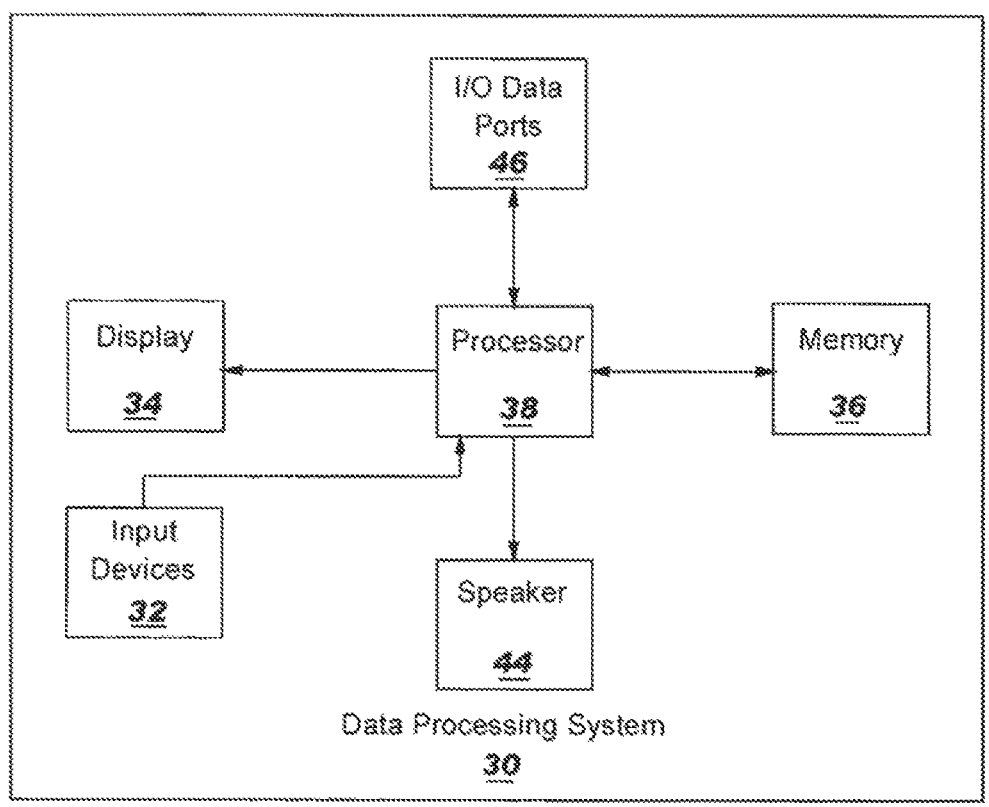
FIG. 1 is a block diagram of a data processing system suitable for use according to some embodiments of the present invention.

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items and may be abbreviated as "/".

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, "dependency tree" or "dependency chain" means the cells or information contained therein (i.e., data and/or formula(s)) that directly or indirectly depend from a given root cell (referred to as "dependents" of the root cell) or from which a given root cell directly or indirectly depends (referred to as "precedents" of the root cell). A dependency tree may have one or more branches. A "branch cell" is a cell in a dependency tree and may be a dependent cell or a precedent cell.

As used herein, "leaf cell" means a cell that is the last or terminal cell in a branch of a dependency tree of a root cell (i.e., the leaf cell does not depend on any other cell in the spreadsheet). A leaf cell is a kind of branch cell.

Unless otherwise disclosed herein, a user may select a cell, option, feature or other element or function by any suitable means or method, including known and conventional techniques for providing selection input to a computer application. For example, a cell or box may be selected by placing a cursor over the cell or box and clicking a mouse button, tabbing to the cell or box and pressing an "Enter" key, etc.

As used herein, "indicia" may include one or more indicia.

As will be appreciated by one of skill in the art, the invention may be embodied as methods, data processing systems, and/or computer program products. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as JAVA7, Smalltalk or C++. However, the computer program code for carrying out operations of the present invention may also be written in conventional procedural programming languages, such as the "C" programming language or in a visually oriented programming environment, such as VisualBasic.

The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The invention is described in part below with reference to flowchart illustrations and/or block diagrams of methods, systems and/or computer program products according to embodiments of the invention. It will be understood that each block of the illustrations, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Embodiments of the present invention will now be discussed with respect to FIGS. 1-19. As described herein, some embodiments of the present invention provide tracking and display features for facilitating visualization of interrelationships among cells of a spreadsheet. The tracking and display features may provide enhanced usability and allow for improved navigation within dependency and/or precedents chains. The tracking and display features may be used without leaving the spreadsheet window and may generally operate as an overlay to the spreadsheet application so that the user is still able to interact with the spreadsheet in some or all other previously defined ways. The tracking and display features may provide for real time updates to visual aids.

The flowcharts and block diagrams of FIGS. 1, 2 and 12-19 illustrate the architecture, functionality, and operation of possible implementations of systems, methods and computer program products according to various embodiments of the present invention. In this regard, each block in the flow charts or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be understood that each block of the block diagrams and/or flowchart illustrations, and combinations of blocks in the block diagrams and/or flowchart illustrations, can be implemented by special purpose hardware-based systems which perform the specified functions or acts, or combinations of special purpose hardware and computer instructions.

Referring now to FIG. 1, a block diagram of data processing systems suitable for use in systems according to some embodiments of the present invention will be discussed. As illustrated in FIG. 1, an exemplary embodiment of a data processing system 30 typically includes input device(s) 32 such as a keyboard or keypad, a display 34, and a memory 36 that communicate with a processor 38. The data processing system 30 may further include a speaker 44, and an I/O data port(s) 46 that also communicate with the processor 38. The I/O data ports 46 can be used to transfer information between the data processing system 30 and another computer system or a network. These components may be conventional components, such as those used in many conventional data processing systems, which may be configured to operate as described herein.

Figure 2:
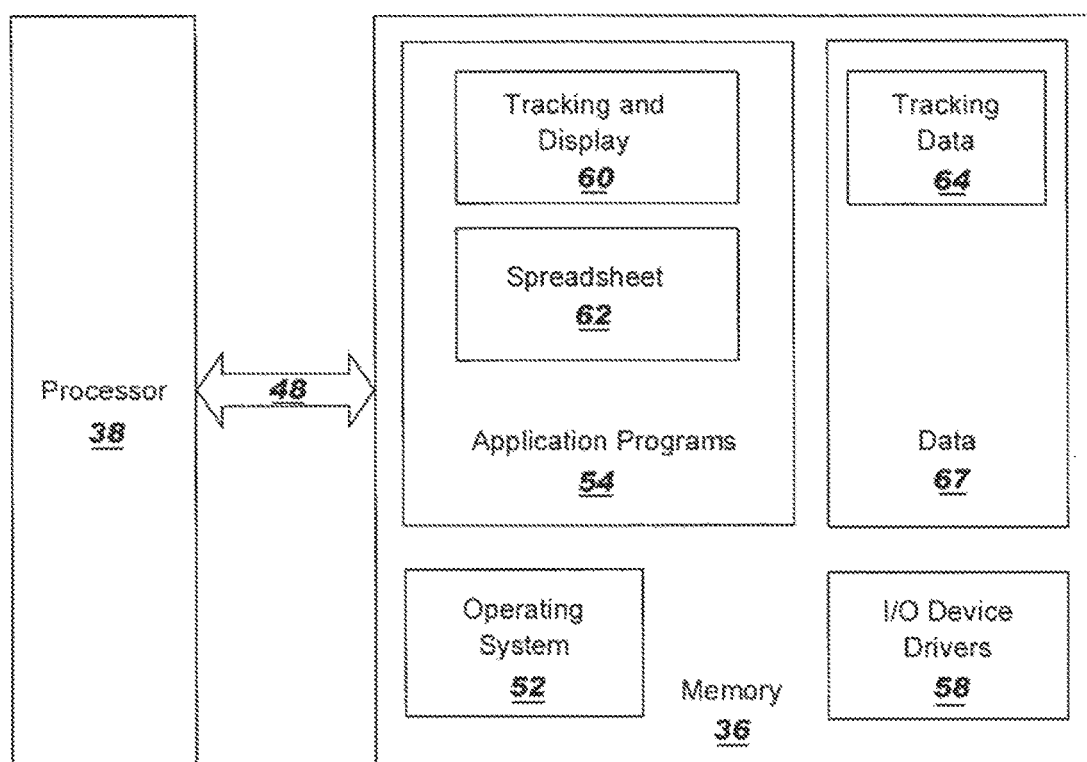
FIG. 2 is a more detailed block diagram of a system for providing tracking and display of interrelationships among cells of a spreadsheet in accordance with some embodiments of the present invention.

FIG. 2 is a block diagram of data processing systems that illustrate systems, methods, and/or computer program products in accordance with embodiments of the present invention. The processor 38 communicates with the memory 36 via an address/data bus 48. The processor 38 can be any commercially available or custom processor, such as a microprocessor. The memory 36 is representative of the overall hierarchy of memory devices containing the software and data used to implement the functionality of the data processing system 30. The memory 36 can include, but is not limited to, the following types of devices: cache, ROM, PROM, EPROM, EEPROM, flash memory, SRAM and/or DRAM.

As shown in FIG. 2, the memory 36 may include several categories of software and data used in the data processing system 30: the operating system 52; the application programs 54; the input/output (I/O) device drivers 58; and the data 67. As will be appreciated by those of skill in the art, the operating system 52 may be any operating system suitable for use with a data processing system, such as OS/2, AIX or System390 from International Business Machines Corporation, Armonk, N.Y., Windows95, Windows98, Windows2000 or WindowsXP from Microsoft Corporation, Redmond, Wash., Unix or Linux. The I/O device drivers 58 typically include software routines accessed through the operating system 52 by the application programs 54 to communicate with devices such as the I/O data port(s) 46 and certain memory 36 components. The application programs 54 are illustrative of the programs that implement the various features of the data processing system 30. Finally, the data 67 represents the static and dynamic data used by the application programs 54, the operating system 52, the I/O device drivers 58, and other software programs that may reside in the memory 36.

As is further seen in FIG. 2, the application programs 54 may include a tracking and display module 60 and at least one spreadsheet application 62. Such applications may include, for example, web pages, servlets, applets or the like.

The data portion 67 of memory 36, as shown in the embodiments illustrated in FIG. 2, may include tracking data 64.

While embodiments of the present invention have been illustrated in FIG. 2 with reference to a particular division between application programs, data and the like, the present invention should not be construed as limited to the configuration of FIG. 2 but is intended to encompass any configuration capable of carrying out the operations described herein.

Spreadsheets and their operation are well known to those of skill in the art and therefore will not be described in detail herein. A spreadsheet is typically represented in a computer program as a two dimensional array of data structures associated with respective cells. Each data structure contains, among other things, data or a formula of the cell, a linked list of pointers to cells that depend on the cell (referred to as dependents), and a linked list of pointers to cells from which that cell depends (referred to as precedents). Conceptually, the pointers form a dependency tree, wherein the reference cell may be referred to as a root cell and the dependent cells and precedent cells terminating branches of the tree may be referred to as leaf cells. Cells in the tree may be characterized by their level, that is, the number of steps between the branch cell and a given root cell.

The spreadsheet application may be configured to evaluate a cell to determine if there are any cells mentioned in the formula of the cell. The application may likewise evaluate the mentioned cell or cells and so forth to map the dependency and/or precedence interrelationships between all or selected ones of the cells of the spreadsheet. Such evaluations may be made in any suitable manner. Systems and methods for assessing and updating dependency chains among cells of a spreadsheet are well known to those of skill in the art. For example, a suitable method is described in U.S. Pat. No. 6,460,059 to Wisniewski, the disclosure of which is incorporated herein by reference in its entirety.

FIGS. 12-19 are flow charts illustrating the methods, systems, and program products according to certain embodiments of the present invention. It will be understood that each step of the flow chart, and combinations of the steps in the flow chart diagram, can be implemented by computer program instructions. These computer program instructions may be loaded onto a computer or other programmable data processing apparatus to produce a machine such that the instructions which execute on the computer or other programmable apparatus create means for implementing the functions specified in the flow chart step(s). These computer program instructions may also be stored in a computer readable memory that can direct a computer or other programmable apparatus to function in a particular manner, such that the instructions stored in the computer readable memory produce an article of manufacture including instruction means which implement the functions specified in the flow chart step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flow chart step(s).

Accordingly, steps of the flow chart illustrations support combinations of means for performing the specified functions, combinations of steps for performing the specified functions and program instruction means for performing the specified function.

Figure 12:
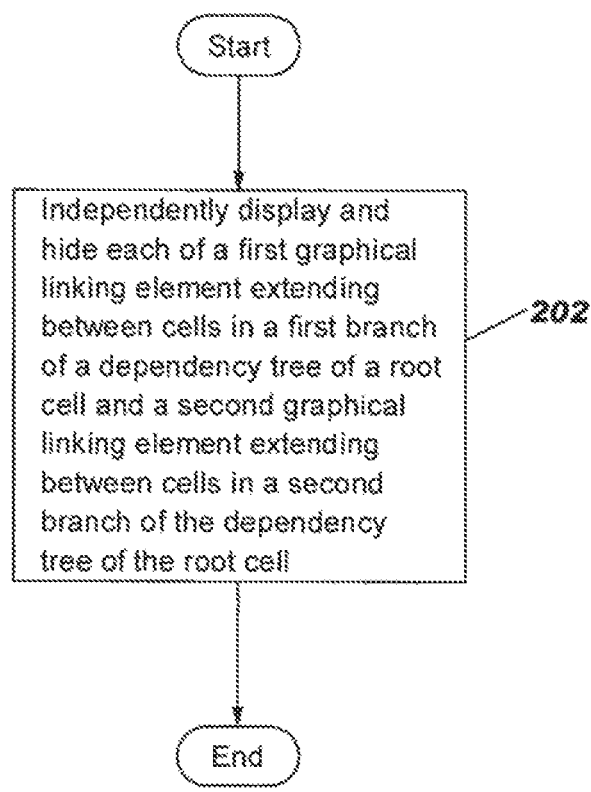
FIGS. 12-17 are flowcharts illustrating operations for visually indicating relationships between cells in a spreadsheet according to some embodiments of the present invention.

Referring now to the flow chart of FIG. 12, operations in accordance with embodiments of the present invention for visually indicating relationships among cells in a spreadsheet are shown therein. In such operations, each of a first graphical linking element extending between cells in a first branch of a dependency tree of a root cell and a second graphical linking element extending between cells in a second branch of the dependency tree of the root cell is independently displayed and hidden (Block 202).

Figure 13:
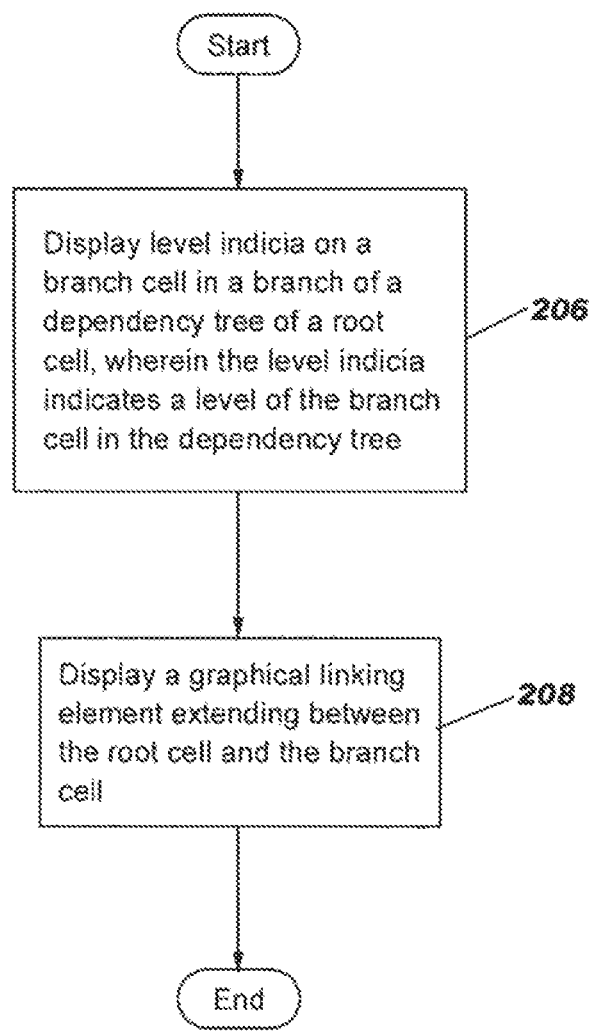

Referring now to the flow chart of FIG. 13, further operations in accordance with embodiments of the present invention for visually indicating relationships among cells in a spreadsheet are shown therein. Level indicia is displayed on a branch cell in a branch of a dependency tree of a root cell (Block 206). The level indicia indicates a level of the branch cell in the dependency tree. A graphical linking element extending between the root cell and the branch cell is displayed (Block 208).

Figure 14:
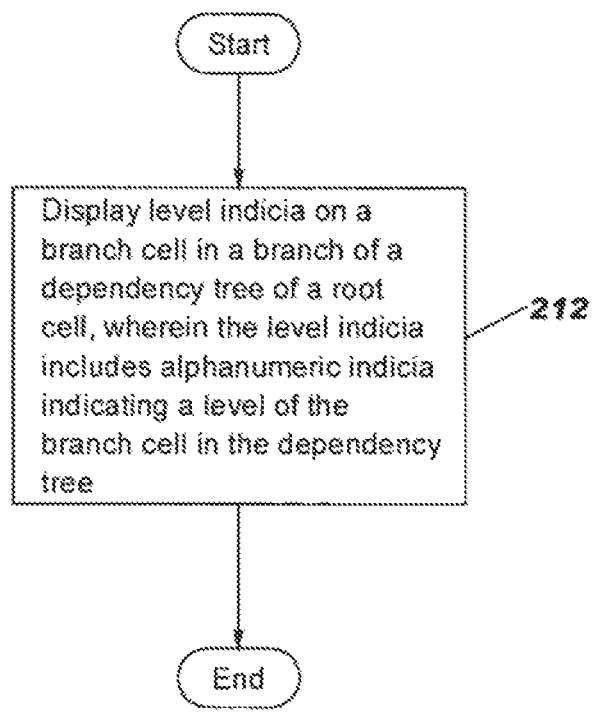

Referring now to the flow chart of FIG. 14, further operations in accordance with embodiments of the present invention for visually indicating relationships among cells in a spreadsheet are shown therein. Level indicia is displayed on a branch cell in a branch of a dependency tree of a root cell (Block 212). The level indicia includes alphanumeric indicia indicating a level of the branch cell in the dependency tree.

Figure 15:
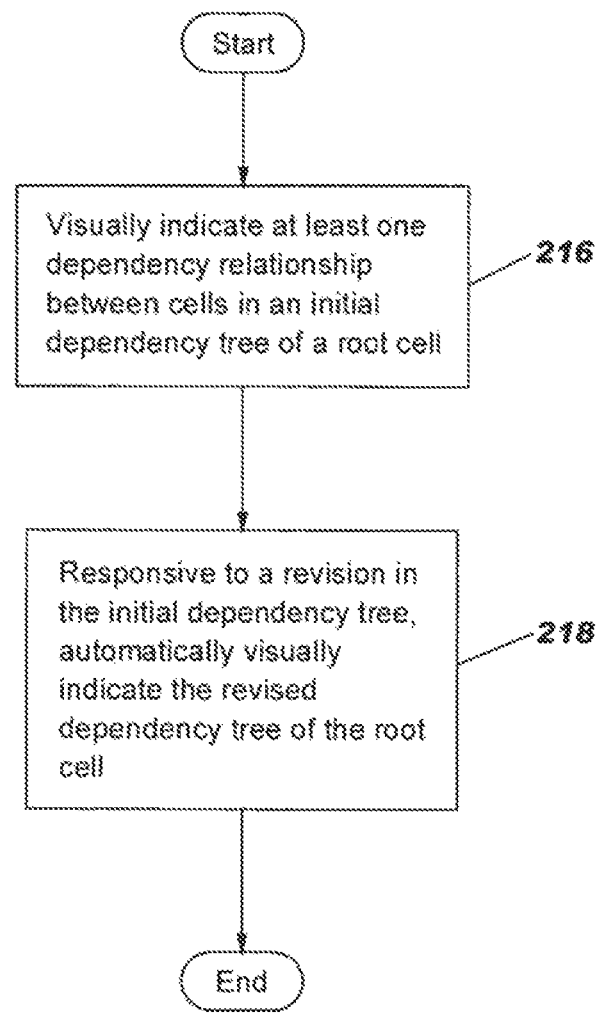

Referring now to the flow chart of FIG. 15, further operations in accordance with embodiments of the present invention for visually indicating relationships between cells in a spreadsheet are shown therein. At least one dependency relationship between cells in an initial dependency tree of a root cell is visually indicated (Block 216). Responsive to a revision in the initial dependency tree, the revised dependency tree of the root cell is automatically visually indicated (Block 218).

Figure 16:
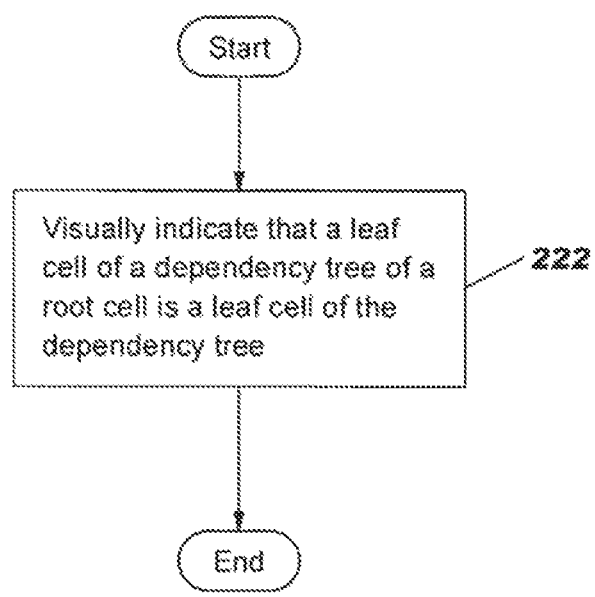

Referring now to the flow chart of FIG. 16, further operations in accordance with embodiments of the present invention for visually indicating relationships between cells in a spreadsheet are shown therein. Visual indication is provided that a leaf cell of a dependency tree of a root cell is a leaf cell of the dependency tree (Block 222).

Figure 17:
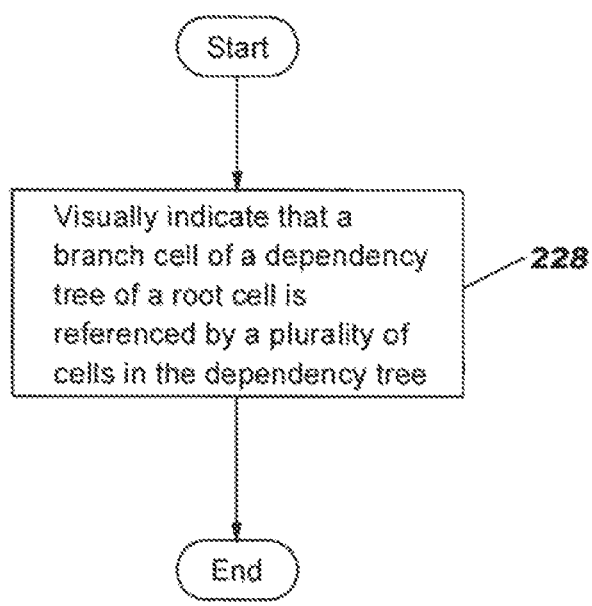

Referring now to the flow chart of FIG. 17, further operations in accordance with embodiments of the present invention for visually indicating relationships between cells in a spreadsheet are shown therein. Visual indication is provided that a branch cell of a dependency tree of a root cell is referenced by a plurality of cells in the dependency tree (Block 228).

Figure 18:
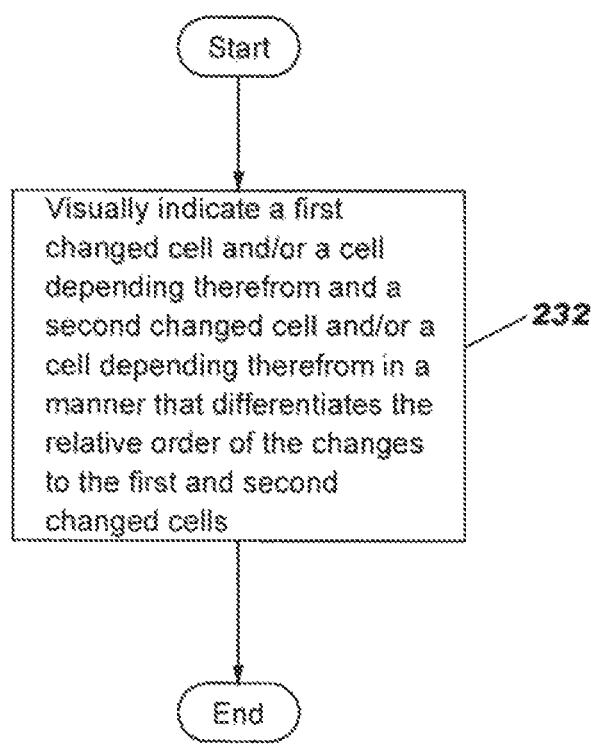
FIG. 18 is a flowchart illustrating operations for visually indicating changes to cells in a spreadsheet according to some embodiments of the present invention.

Referring now to the flow chart of FIG. 18, operations in accordance with embodiments of the present invention for visually indicating changes to cells in a spreadsheet are shown therein. A first changed cell and/or a cell depending therefrom and a second changed cell and/or a cell depending therefrom are visually indicated in a manner that differentiates the relative order of the changes to the first and second changed cells (Block 232).

Figure 19:
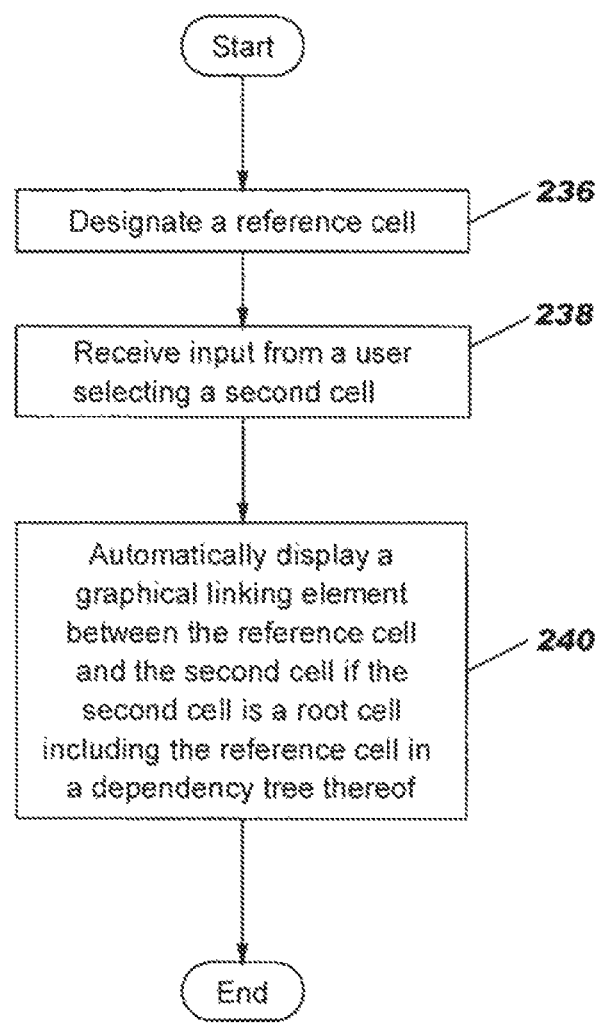
FIG. 19 is a flowchart illustrating further operations for visually indicating relationships between cells in a spreadsheet according to some embodiments of the present invention.

Referring now to the flow chart of FIG. 19, operations in accordance with embodiments of the present invention for visually indicating relationships between cells in a spreadsheet are shown therein. A reference cell is designated (Block 236). Input selecting a second cell is received from a user (Block 238). A graphical linking element between the reference cell and the second cell is automatically displayed if the second cell is a root cell including the reference cell in a dependency tree thereof (Block 240).

In accordance with embodiments of the present invention and as will be apparent from the description that follows, the operations of FIGS. 12-19 may be employed together in various combinations and subcombinations. For example, the level indicia of the method of FIG. 13 may include alphanumeric indicia as discussed with reference to FIG. 14 and the graphical linking element may be one of a first graphical linking element and a second graphical linking element that are independently displayed and hidden as discussed with reference to FIG. 12.

Methods, systems, and program products according to certain embodiments of the present invention will now be described in more detail with reference to an exemplary spreadsheet 100 as shown in FIGS. 3-11. With reference to FIG. 3, the spreadsheet 100 has columns A-E and rows 1-9 that are displayed on the display 34 (i.e., are "on screen"), for example. The spreadsheet 100 may include additional columns and/or rows that are not shown on the display (i.e., are "off screen"), but which may be shown on the display by moving the spreadsheet in the display (e.g., by scrolling). In the exemplary spreadsheet, at least rows 10-14 are off screen as discussed below.

Each of the columns A-E and rows 1-14 defines a cell A1, A2, B1, B2, etc. as will be readily appreciated by those of ordinary skill in the art. As shown, at least certain of the cells have formulas or data values therein. As shown, the spreadsheet 100 is in a mode wherein the formulas are themselves displayed as may be preferred for debugging, etc. However, the various aspects of the present invention may also be employed when the spreadsheet is in a mode wherein the resulting values from the formulas are displayed in place of or in addition to the formulas.

Figure 4:
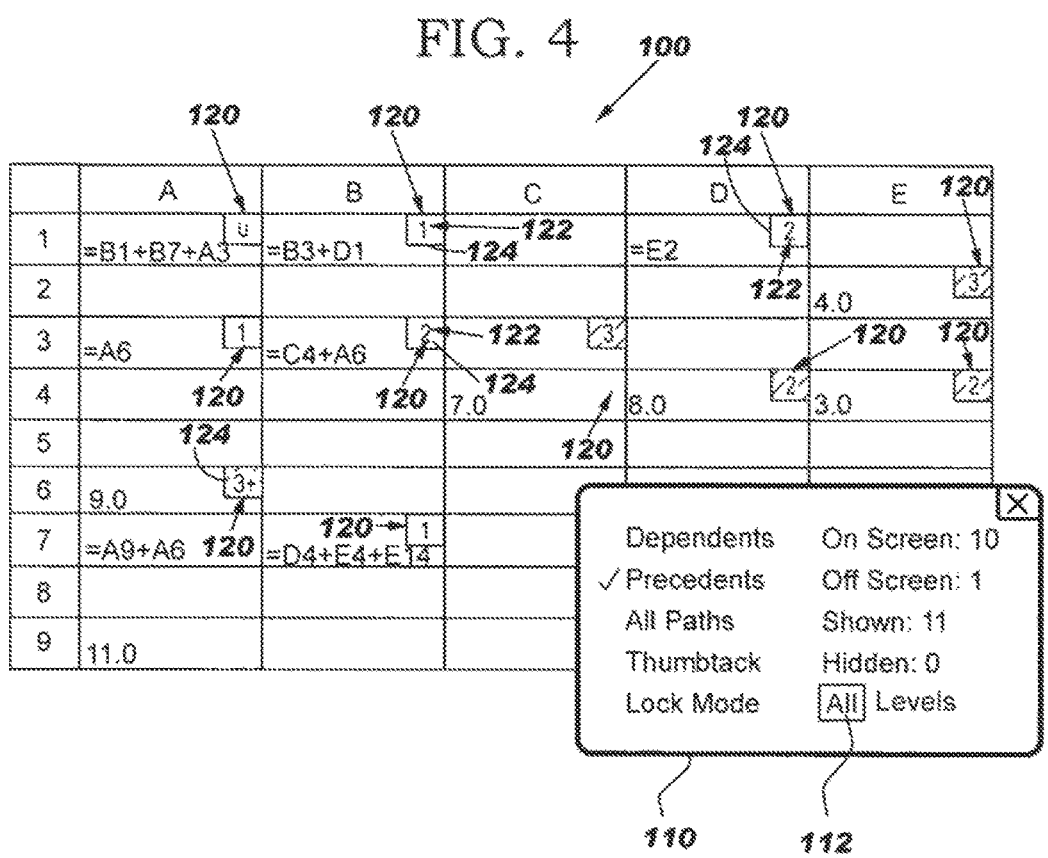
FIG. 4 represents the same spreadsheet as in FIG. 3, wherein cell A1 is selected for focus and a precedents tracking and display feature is enabled with respect to that cell according to embodiments of the invention.

The user may invoke the tracking and display feature of the tracking and display module 60 when the user desires assistance in assessing the interrelationships of some or all of the cells of the spreadsheet 100. The tracking and display feature allows the user to "visualize" the dependency relationships of a chosen cell. The tracking and display feature may be enabled by any suitable method. For example, the tracking and display feature may be listed as an option on a tool bar displayed adjacent the spreadsheet 100, or a pull down menu thereof. When enabled, the tracking and display module 60 provides a dialogue box 110 overlying or adjacent the spreadsheet 100, as shown in FIG. 4. The dialogue box 110 includes a number of menu options as well as information reporting fields. It will be appreciated that the dialogue box 110 may be replaced of supplemented with other suitable mechanisms for receiving input from the user and displaying the desired the information to the user.

The user may choose to track and display the precedents to a cell, the dependents to a cell, or both the dependents and the precedents to a cell by selecting "Dependents", "Precedents", or both, respectively, from the dialogue box 110. The user may select the number of levels to track and display by entering the corresponding number in the entry field box 112 to the left of "Levels" in the dialogue box 110. If the user does not enter a number, the tracking and display module may apply a default such as all levels.

The user selects a "root cell" to visualize by selecting (e.g., mouse clicking on) the cell prior to or after invoking the tracking and display feature. For the purposes of explanation, the user selects cell A1 as the root cell and selects "Precedents" and "All" levels from the dialogue box 110. Responsive to this input, the tracking and display module 60 automatically maps the precedents dependency tree of the root cell A1 (i.e., identifies the precedents in the dependency tree of the root cell and determines their relationships to the root cell A1 and one another).

The tracking and display module 60 then tags each precedent cell up to the chosen level (in the example, all levels) with a respective visual indicator or tag or label 120 indicating that the cell is a node in (i.e., forms a part of) the precedents tree of the root cell, as shown in FIG. 4. The label may include a sequence tag or level indicia that indicates the level of the respective cell relative to the root cell A1, that is, the level of separation between the root cell and the referenced cell. The label 120 may include an incremented portion. According to some embodiments and in accordance with the operations discussed with reference to FIG. 14, the label 120 includes alphanumeric indicia or text such as a number 122 indicating the relative rank of the cell in the tree. For example, in FIG. 4, cell B1 is labeled "1" because it is directly referenced by the root cell A1; cell B3 is labeled "2" because is referenced by the root cell A1 indirectly via the intermediate cell B1; and cell A6 is labeled "3" because is referenced by the root cell A1 indirectly via the intermediate cell B3, which is in turn referenced by the root cell A1 indirectly via the intermediate cell B1, which is in turn directly referenced by the root cell A1. As will be appreciated from the spreadsheet as shown in FIG. 4 and review of the formulas recited therein, in accordance with some embodiments, the tracking and display module 60 labels each of the cells in the precedents tree of the root cell A1 and each such label indicates the level of the cell in its respective branch of the tree. The root cell A1 is also labeled with a "U" or otherwise marked (e.g., shaded) to indicate that it is the root cell upon which the tracking and display feature is focused. According to some embodiments, a cell such as the cell A6 that is at a different level in different branches of a root cell is labeled with the highest appropriate level number. The labels 120 may include boxes 124 enclosing the numbers 122 as shown to enhance their visual effect and clarity.

According to some embodiments and in accordance with the operations as discussed above with reference to FIG. 16, the cells that are leaf cells (i.e., last in the chain) are further labeled or tagged to indicate such status. As shown, these cells (i.e., cells A6, C4, D4, E2 and E4) are indicated by shading in their label boxes 124.

According to some embodiments and in accordance with operations as discussed above with reference to FIG. 17, any labeled cells that are non-cyclically referenced more that once in the tree of the root cell are further labeled to indicate such status. In the spreadsheet of FIG. 4, cell A6 is such a cell and is indicated by a "+" sign in its label box 124.

Because one or more cells in the relevant tree of the root cell may not be shown on the display at any given time, the tracking and display module 60 may further assess and display the following data in the dialogue box 110:

1. The number of cells in the selected tree that are within the portion of the spreadsheet displayed on the screen of the display, whether labeled or not, which number is listed after "On screen" in the dialogue box;
2. The number of cells in the selected tree that are not within the portion of the spreadsheet displayed on the screen of the display, whether labeled or not, which number is listed after "Off screen" in the dialogue box;
3. The number of cells in the selected tree that are labeled (i.e., those cells of the tree up to the selected level), which number is listed after "Shown" in the dialogue box; and
4. The number of cells in the selected tree that are not labeled (i.e., those cells of the tree above the selected level), which number is listed after "Hidden" in the dialogue box.

The user may thereafter activate the tracking and display feature to provide an additional visual indication of the interrelationships between the root cell A1 and the cells of its precedents tree. Referring to FIG. 5, the user may select (e.g., mouse click on) the label box 124 of a cell of interest to invoke one or more graphical linking elements such as graphical path lines or segments extending between the chosen cell and the root cell. For example, in FIG. 5, the user has selected the label box 124 of the cell E4. In response, the tracking and display module 60 has drawn a path line 130 from the cell E4 to the cell B7 (i.e., the formula of cell B7 references cell E4) and a second path line 132 from the cell B7 to the root cell A1 (i.e., the formula of root cell A1 references the cell B7).

The user may select (e.g., mouse click on) the label box 124 of the cell E4 again to hide or clear the path lines 130, 132. The user may also select any other cell to draw the associated path lines (See, generally, FIGS. 12 and 13). For example, to transition from the spreadsheet of FIG. 5 to the spreadsheet of FIG. 6, the user may select the label box of the cell E4 to hide the path lines 130, 132 and select the label box of the cell B3 (the two label boxes may be selected in either order). Notably, the cell B3 is an intermediate cell and selecting the label box 124 of that cell activates only the path lines 134, 136 from cell B3 to the root cell A1. If path lines from the cell A6 to the root cell A1 are desired, for example, they can be invoked by selecting the label box of the cell A6.

Figure 7:
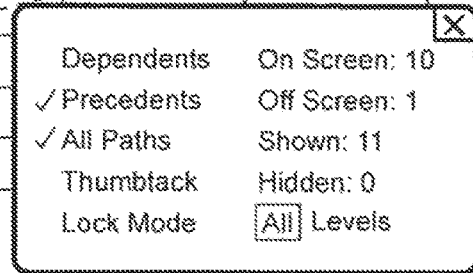
FIG. 7 represents the same spreadsheet as in FIG. 6, except that the path display feature is enabled with respect to all cells, according to embodiments of the invention.

Thus, by appropriately selecting (e.g., mouse clicking on) the label boxes of the labeled cells, the user may independently toggle on and off the visibility of path lines (i.e., between a displayed state and hidden state) from any one or more of the branch cells to the root cell A1. Moreover, by selecting the "All paths" option from the menu of the dialogue box 110, the user may display all of the path lines of the tree of the root cell A1 as shown in FIG. 7. Path lines such as the path line 138 (to the cell E14) may be indicated as extending off screen to the appropriate cell. All of the path lines shown in FIG. 6 may be invoked by selecting the appropriate cell label boxes 124.

A new root cell may be selected by mouse clicking on or within any cell in the area outside of the cell's label box 124, if any. When the new root cell is selected, the labels associated with the previous root cell are cleared from the spreadsheet and new labels are placed on the cells of the selected tree of the new root cell. The tracking and display feature may operate and be used in the same manner as discussed above for the new root cell.

According to some embodiments of the invention and in accordance with operations as discussed above with reference to FIG. 19, the tracking and display module 60 includes a thumbtack option. The thumbtack option may be used to designate a cell from which path lines will be automatically drawn by the tracking and display module 60 when any root cell is selected that includes the designated ("thumbtacked") cell in its defined tree. For example, with the spreadsheet 100 in the state as shown in FIG. 4, the cell A6 may be selected by the user to be thumbtacked. The cell A6 may be thumbtacked by selecting the cell A6 and a "thumbtack" option from a right mouse click or pull down menu or the dialog box 110. The dialog box 110 may indicate that a cell is thumbtacked, as shown in FIG. 8. Alternatively or additionally, the cell A6 may be modified with a border, shading, a label, or the like to indicate that it is a thumbtacked cell.

Figure 9:
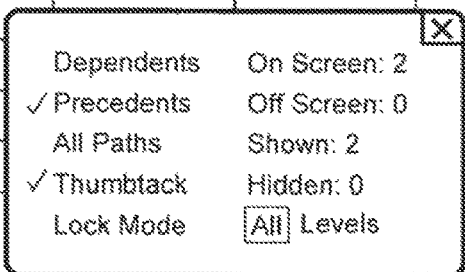
FIG. 9 represents the same spreadsheet as in FIG. 8, except cell A7 is selected for focus and the thumbtack feature remains enabled with respect to cell A6, according to embodiments of the invention.

When the cell A6 is thumbtacked, the tracking and display module 60 will automatically generate all of the path lines 140, 142, 144, 146, 148 from the cell A6 to the root cell A1 as shown in FIG. 8. Thus, it is not necessary for the user to mouse click on the label box 124 of the cell A6 to invoke these path lines. If the user then selects a new root cell, then the tracking and display module 60 automatically draws the applicable path line(s) from the thumbtacked cell A6 to the new root cell in addition to displaying the labels as described above. According to some embodiments, the tracking and display module 60 also automatically clears any path lines not representing the path from the thumbtacked cell to the new root cell. For example, as shown in FIG. 9, the path line 150 is automatically drawn from the thumbtacked cell A6 to the cell A7 when the cell A7 is selected as the new root cell. Multiple cells may be designated as thumbtacked cells at once.

According to some embodiments of the present invention and in accordance with operations as discussed above with reference to FIG. 15, the focus of the tracking and display feature may be locked on a selected root cell. This may allow the user to modify the formula of a cell in the chain of the root cell and visualize the effect(s) on the chain in real time, allowing the user to view changes graphically while editing. The tracking and display module may automatically clear and/or draw or redraw path lines in accordance with changes to the tree of the root cell.

For example, with the spreadsheet 100 in the configuration as shown in FIG. 4, the user may lock the focus on the root cell A1. The focus may be locked on the cell A1 by selecting a "lock focus" option from a right mouse click or pull down menu or the dialog box 110. The dialog box 110 may indicate that the root cell is locked or that the tracking and display feature is in "Lock mode" (as shown in FIG. 10). Alternatively or additionally, the cell A1 may be modified with a border 154 (as shown in FIG. 10), shading, a label, or the like to indicate that the focus is locked thereon.

With the focus locked on the root cell A1, the user may then modify the formula of a cell in the chain of the cell A1. For example, as shown in FIG. 10, the formula of cell B7 is changed from "=D4+E4+E14" to "=D4+A7+E14". As a result, the cell E4 is no longer referenced directly or indirectly by the root cell A1 and the label 120 of the cell E4 is therefore automatically (i.e., without requiring user input other than entry of the revised formula) cleared by the tracking and display module 60. Likewise, if a path line were drawn from the cell B7 to the cell E4, it would also be cleared when the formula of cell B7 is changed as described. Additionally, the cell A7 is now introduced into the chain of the root cell A1 and the tracking and display module 60 automatically and appropriately labels the cell A7 with a label 120.

As a further example, with the spreadsheet 100 configured as shown in FIG. 10, the user selects (e.g., mouse clicks on) the label box of cell D1 so that the tracking and display module 60 draws a path line from D1 to B1 and a path line from B1 to A1 (not shown). The user then enters a new formula in cell C2 as shown and modifies the formula of cell B1 to reference C2 instead of cell D1, as shown in FIG. 11. The tracking and display module 60 automatically clears the path line from the cell D1 to the cell B1 and draws a new path line 156 from the cell D1 to the cell C2 and a new path line 158 from the cell C2 to the cell B1 as shown in FIG. 11.

According to some embodiments of the present invention and in accordance with operations as discussed above with reference to FIG. 18, the tracking and display module 60 provides for tracking of changes made to the spreadsheet 100 for a period of time or number of revision cycles. For example, each time a change is made to a formula, the tracking and display module 60 may graphically mark the changed cell and all cells (up to the selected level) that are dependent on the changed cell. As subsequent changes are made to formulae of the spreadsheet 100, the tracking and display module 60 may mark the newly affected cells or the earlier revised cells in a manner that reflects their relative order modification. According to some embodiments, the tracking and display module 60 shades a first revised cell and its dependents at a first level of darkness. When a subsequent change is made to the same or a further cell, the changed cell and any of its dependents are shaded to the first level of darkness and the shading of the first revised cell and its dependents is lightened. This process may continue for subsequent changes through a selected number of changes until the first revised cell and its dependents fade to the standard color, etc. For example, in FIG. 10, the cells B7 and A1 are shaded to a first level because of the change to the formula of cell B7. In FIG. 11, the cells C2, B1 and A1 are shaded to the first level because of the entry of the new formula in cell C2, and the shading of the cell B7 is faded to a second level.

While the examples set forth above involve the tracking and visual indication of precedents to root cells, various of the aspects of the present invention may be used to track and visually indicate dependents to root cells, as will be appreciated by those of skill in the art from the description herein.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

That which is claimed is:

1. A method for visually indicating relationships among cells in a spreadsheet, the method executed by a data processing system, comprising:
   displaying level indicia on a branch cell in a branch of a dependency tree of a root cell, wherein the level indicia indicates a level of the branch cell in the dependency tree;
   displaying a graphical linking element extending between the root cell and the branch cell;
   visually indicating at least one dependency relationship between cells in an initial dependency tree of a root cell; and
   responsive to a revision in the initial dependency tree, automatically visually indicating the revised dependency tree of the root cell,
   wherein:
      visually indicating at least one dependency relationship between cells in an initial dependency tree of a root cell comprises displaying a first graphical linking element visually indicating a first path in the initial dependency tree;
      automatically visually indicating the revised dependency tree of the root cell comprises displaying a second graphical linking element visually indicating a revised path in the revised dependency tree that is different from the first path, and
      wherein the level indicia displayed on the branch cell comprises a label box in the branch cell and the graphical linking element comprises a path line between the label box of the branch cell and a label box of the root cell.

2. The method of claim 1, further comprising selectively displaying and hiding the graphical linking element responsive to input from a user.

3. The method of claim 1, further comprising toggling the graphical linking element between a displayed state and a hidden state in response to successive selection of the branch cell by the user.

4. The method of claim 1, wherein the level indicia includes alphanumeric indicia indicating the level of the branch cell in the dependency tree.

5. The method of claim 1, wherein the revision to the initial dependency tree is a revision to a branch cell of the initial dependency tree.

6. The method of claim 5, further comprising:
   receiving input from a user to lock focus on the rot cell; and thereafter receiving input from the user to revise the branch cell.

7. The method of claim 1, wherein:
   visually indicating at least one dependency relationship between cells in an initial dependency tree of a root cell comprises displaying a first level indicator indicating a level of a branch cell in the initial dependency tree; and
   automatically visually indicating the revised dependency tree of the root cell comprises displaying a second level indicator indicating a level of a branch cell in the revised dependency tree; and
   the second level indicator represents a different level than the first level and/or is associated with a different branch cell than the branch cell with which the first level indicator is associated.

8. A method for visually indicating relationships among cells in a spreadsheet, the method executed by a data processing system, comprising:
   displaying level indicia on a branch cell in a branch of a dependency tree of a root cell, wherein the level indicia comprises a label box that indicates a level of the branch cell in the dependency tree;
   visually indicating, other than by indentation, that a leaf cell of a dependency tree of a root cell is a leaf cell of the dependency tree;
   visually indicating at least one dependency relationship between cells in an initial dependency tree of a root cell; and
   automatically visually indicating a revised dependency tree of the root cell responsive to a revision in the initial dependency tree,
   wherein:
   visually indicating the at least one dependency relationship between cells in the initial dependency tree of a root cell by displaying a first graphical linking element visually indicating a first path in the initial dependency tree; and
   automatically visually indicate the revised dependency tree of the root cell by displaying a second graphical linking element visually indicating a revised path in the revised dependency tree that is different from the first path.

9. The method of claim 8, wherein the revision to the initial dependency tree is a revision to a branch cell of the initial dependency tree.

10. The method of claim 9, wherein the data processing system is configured to: receive input from a user to lock focus on the root cell; and thereafter receive input from the user to revise the branch cell.

11. The method of claim 8, wherein the data processing system is configured to:
   visually indicate at least one dependency relationship between cells in the initial dependency tree of a root cell by displaying a first level indicator indicating a level of a branch cell in the initial dependency tree; and
   automatically visually indicate the revised dependency tree of the root cell by displaying a second level indicator indicating a level of a branch cell in the revised dependency tree; and
   wherein the second level indicator represents a different level than the first level and/or is associated with a different branch cell than the branch cell with which the first level indicator is associated.

12. The method of claim 8, further comprising displaying terminal indicia on the leaf cell to indicate that the leaf cell is a leaf cell of the dependency tree.

13. The method of claim 8, further comprising visually indicating that a branch cell of the dependency tree of the root cell is referenced by a plurality of cells in the dependency tree.

14. The method of claim 13, further comprising displaying indicia on the branch cell to indicate that the branch cell is referenced by a plurality of cells in the dependency tree.

15. The method of claim 8, further comprising displaying a graphical linking element extending between the root cell and the branch cell, the graphical linking element comprising a path line with a first endpoint in the branch cell and a second endpoint in the root cell.

* * * * *